United States Patent
Murata et al.

(10) Patent No.: US 11,325,651 B2
(45) Date of Patent: May 10, 2022

(54) VEHICLE BODY STRUCTURE

(71) Applicant: Toyota Jidosha Kabushiki Kaisha, Toyota (JP)

(72) Inventors: Soshiro Murata, Nagoya (JP); Takashi Sagisaka, Miyoshi (JP); Ayaka Kagami, Inazawa (JP); Hidenori Tago, Fukuyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 102 days.

(21) Appl. No.: 16/667,216

(22) Filed: Oct. 29, 2019

(65) Prior Publication Data

US 2020/0180702 A1 Jun. 11, 2020

(30) Foreign Application Priority Data

Dec. 6, 2018 (JP) .............................. JP2018-229287

(51) Int. Cl.
  *B62D 21/15* (2006.01)
  *B62D 29/00* (2006.01)
  (Continued)

(52) U.S. Cl.
  CPC ....... *B62D 21/155* (2013.01); *B62D 25/2027* (2013.01); *B62D 27/023* (2013.01); *B62D 29/00* (2013.01)

(58) Field of Classification Search
  CPC .... B62D 21/155; B62D 21/02; B62D 21/152; B62D 25/2027; B62D 25/20;
  (Continued)

(56) References Cited

U.S. PATENT DOCUMENTS 6,199,894 B1 * 3/2001 Anderson .............. B62D 61/12
                                              280/638
7,959,197 B2 * 6/2011 Agrahari ................. B60R 19/34
                                              293/102
(Continued)

FOREIGN PATENT DOCUMENTS

DE   102004019750 A1 * 12/2005 ........... B62D 29/008
DE   102007006722 A1   12/2008
(Continued)

OTHER PUBLICATIONS

JP2001347966A, Teruyuki, Floor Underbody Structure for Vehicle), Japanese Patent Office, Dec. 18, 2001 (Year: 2001).*
(Continued)

*Primary Examiner* — Dennis H Pedder
*Assistant Examiner* — Joyce Eileen Hill
(74) *Attorney, Agent, or Firm* — Dinsmore & Shohl LLP (57) ABSTRACT

There is provided a vehicle body structure, including: a die-cast rear floor side member; and a metal rear floor side member rear, a joint section including: an inner joint section provided at a side of the rear floor side member, the inner joint section including at least three joining faces including an upper face provided at an upper portion, in a vehicle vertical direction, of the inner joint section and two faces positioned with orientations intersecting the upper face in a cross-section profile of the inner joint section sectioned along the vehicle vertical direction and the vehicle width direction, and an outer joint section provided at the side of the rear floor side member rear, the outer joint section abutted against and joined to the three joining faces of the inner joint section from an outer side of the inner joint section.

6 Claims, 10 Drawing Sheets

(51) Int. Cl.
*B62D 27/02* (2006.01)
*B62D 25/20* (2006.01)

(58) Field of Classification Search
CPC .... B62D 25/087; B62D 25/08; B62D 25/026;
B62D 27/023; B62D 29/00; B62D 29/008
USPC .... 296/187.08, 204, 203.01, 203.04, 29, 30;
280/756, 784, 785, 786
See application file for complete search history.

(56) References Cited

U.S. PATENT DOCUMENTS

| | | | |
|---|---|---|---|
| 8,177,292 B1 * | 5/2012 | Baccouche | B62D 25/04 296/193.06 |
| 8,641,131 B2 * | 2/2014 | Honda | B62D 29/005 296/187.12 |
| 2012/0119546 A1 | 5/2012 | Kawamura et al. | |

FOREIGN PATENT DOCUMENTS

| | | | | |
|---|---|---|---|---|
| DE | 102011077810 A1 | * | 12/2012 | ........... B62D 25/025 |
| JP | H05-065078 A | | 3/1993 | |
| JP | 2001-328559 A | | 11/2001 | |
| JP | 2001347966 A | * | 12/2001 | |
| JP | 2012-101713 A | | 5/2012 | |

OTHER PUBLICATIONS

DE 102011077810A1, Gottman et al., "Body for retaining components", German Patent Office, Dec. 20, 2012 (Year: 2012).*
DE 102004019750A1, Werner et al., "Carrier structure, for the rear end of an automobile chassis, has longitudinal steel sheet carriers bonded to aluminum junctions on at least three sides by an adhesive and rivet/screw bolt fasteners", European Patent Office, Dec. 1, 2005 (Year: 2005).*

* cited by examiner

VEHICLE BODY STRUCTURE

CROSS-REFERENCE TO RELATED APPLICATION

This application is based on and claims priority under 35 USC 119 from Japanese Patent Application No. 2018-229287 filed on Dec. 6, 2018, the disclosure of which is incorporated by reference herein.

BACKGROUND

Technical Field

The present disclosure relates to a vehicle body structure.

Related Art

DE 102007006722 discloses technology in which a die-cast aluminum rear floor side member and a metal outer capping member configured by a sheet member are joined together. A cross-section profile of a joint section between the rear floor side member and the outer capping member when sectioned along a vehicle vertical direction and a vehicle width direction is formed with a closed cross-section area. A rear floor side member rear formed from a metal sheet member and provided at a vehicle front-rear direction rear side of the rear floor side member is joined so as to be enclosed from the vehicle width direction outer side by the outer capping member.

During a collision to the rear face of a vehicle (referred to hereafter as in a rear-end collision of a vehicle), collision load input to the rear floor side member rear is transmitted to the rear floor side member through the outer capping member.

As described above, the rear floor side member is formed from die-cast aluminum, and is therefore formed so as to achieve high rigidity. However, since the rear floor side member rear and the outer capping member are formed from sheet members, in a vehicle rear-end collision there is a possibility that out-of-plane deformation of the rear floor side member rear might occur at the joint sections between the rear floor side member and the rear floor side member rear.

SUMMARY

In consideration of the above circumstances, the present disclosure provides a vehicle body structure capable of suppressing out-of-plane deformation of a rear floor side member rear at a joint section between a rear floor side member and the rear floor side member rear in a rear-end collision of a vehicle.

A vehicle body structure according to a first aspect of the present disclosure is configured including a die-cast rear floor side member that extends along a vehicle front-rear direction at an end portion, in a vehicle width direction, of a vehicle rear section; and a metal rear floor side member rear that extends along the vehicle front-rear direction at a rear side, in the vehicle front-rear direction, of the rear floor side member, and that is formed from a sheet member or a tube-shaped member having a uniform thickness, a joint section, at which a rear end portion, in the vehicle front-rear direction, of the rear floor side member and a front end portion, in the vehicle front-rear direction, of the rear floor side member rear are joined together, the joint section including: an inner joint section provided at a side of the rear floor side member so as to configure an inner side of the joint section, the inner joint section including at least three joining faces including an upper face provided at an upper portion, in a vehicle vertical direction, of the inner joint section and two faces positioned with orientations intersecting the upper face in a cross-section profile of the inner joint section sectioned along the vehicle vertical direction and the vehicle width direction, and an outer joint section provided at the side of the rear floor side member rear so as to configure an outer side of the joint section, the outer joint section abutted against and joined to the three joining faces of the inner joint section from an outer side of the inner joint section.

In the vehicle body structure according to the first aspect of the present disclosure, the die-cast rear floor side member extends along a vehicle front-rear direction at a vehicle width direction end portion of a vehicle rear section. Moreover, the metal rear floor side member rear formed from a sheet member or a tube shaped member having a uniform thickness extends along the vehicle front-rear direction at a vehicle front-rear direction rear side of the rear floor side member.

Generally there is a high degree of freedom for design with die-cast members formed by die-casting, and a high rigidity may be obtained when forming by increasing the thickness according to location or by providing reinforcing ribs. By contrast, for example, since sheet members made from metal have a substantially uniform thickness, the rigidity of the sheet member is largely determined by the thickness. Thus from out of a die-cast member and a sheet member, there is a high probability that the sheet member has a lower rigidity. This gives rise to the possibility of out-of-plane deformation of a sheet member at a joint section where a die-cast member and a sheet member are joined together when collision load is transmitted from the sheet member to the die-cast member side in a vehicle collision.

In contrast thereto, in the present disclosure, at a joint section between the die-cast rear floor side member and the metal rear floor side member rear formed from a sheet member or a tube shaped member, the outer joint section configuring the outer side of the joint section provided on the rear floor side member rear side is joined to the outside of the inner joint section configuring the inner side of the joint section provided on the rear floor side member rear side. More specifically, there are at least three joining faces provided to the inner joint section, including the upper face provided to the vehicle vertical direction upper portion of the inner joint section and two faces positioned with orientations intersecting the upper face. In the joint section the outer joint section is abutted and joined to at least these three joining faces from the outside of the inner joint section.

Namely, for example, due to having at least three joining faces, the joint section in the present disclosure is capable of increasing joint rigidity in comparison to cases in which only two joining faces are provided to the inner joint section of the rear floor side member for joining to the outer joint section of the rear floor side member rear, by an amount commensurate with the increase in the number of joining faces. The rear floor side member rear is thereby constrained from deforming by the joint locations with the rear floor side member, and out-of-plane deformation of the rear floor side member rear is suppressed from occurring at the joint section between the rear floor side member and the rear floor side member rear in a rear-end collision of a vehicle.

Note that in the present disclosure "uniform thickness" not only means cases in which the thickness is absolutely the same irrespective of location, but also encompasses cases in which there is manufacturing variation and the like, and cases in which there are slight differences in thickness according to location, i.e. what is referred to as "substantially uniform thickness". Moreover, when referring to a member formed with uniform thickness it does not simply indicate a sheet member, and rather means a member formed such that the thickness is substantially uniform. For example, in cases in which a sheet member is employed, the rear floor side member rear is formed by plastic forming with a press or the like, however, there is no limitation thereto. The meaning also encompasses cases in which the rear floor side member rear is formed as a tube shaped member by extruding or drawing using a die.

Moreover, "two faces positioned with orientations intersecting the upper face" does not necessarily always mean that the "upper face" and the "two faces" are formed so as to be respectively contiguous to each other. For example, one face out of the two faces may be formed in a non-contiguous state to the upper face.

A vehicle body structure according to a second aspect of the present disclosure is the vehicle body structure according to the first aspect, further including: a rear floor side panel that extends along the vehicle front-rear direction and the vehicle width direction at the vehicle width direction end portion of the vehicle rear section, wherein the outer joint section has a cross-section profile, when sectioned along the vehicle vertical direction and the vehicle width direction, that is an open cross-section profile that is open toward a lower side in the vehicle vertical direction, and the outer joint section forms a closed cross-section area against the rear floor side panel.

In the vehicle body structure according to the second aspect of the present disclosure, the rear floor side panel extends along the vehicle front-rear direction and the vehicle width direction at the vehicle width direction end portion of the vehicle rear section. At the joint section between the rear floor side member and the rear floor side member rear, the outer joint section provided to the rear floor side member rear has a cross-section profile when sectioned along the vehicle vertical direction and the vehicle width direction that is an open cross-section profile, open toward the vehicle vertical direction lower side. The outer joint section forms a closed cross-section area against the rear floor side panel. This thereby enables the rigidity of the rear floor side member rear to be raised at the joint section.

A vehicle body structure according to a third aspect of the present disclosure is the vehicle body structure according to the first or the second aspect, wherein the two joining faces positioned with orientations intersecting the upper face are formed at a first sidewall and a second sidewall respectively provided at either side, in the vehicle width direction, of the inner joint section.

In the vehicle body structure according to the third aspect of the present disclosure, at the joint section between the rear floor side member and the rear floor side member rear, the two joining faces positioned with orientations intersecting the upper face provided to the upper portion of the inner joint section of the rear floor side member are formed to the first sidewall and the second sidewall respectively provided on both vehicle width direction sides of the inner joint section.

Namely, the outer joint section of the rear floor side member rear is joined to at least the upper wall where the upper face is formed, the first sidewall, and the second sidewall of the inner joint section of the rear floor side member. This thereby enables the joint rigidity to be raised for the joint section between the rear floor side member and the rear floor side member rear.

The vehicle body structure according to a fourth aspect of the present disclosure is the vehicle body structure according to the third aspect, wherein the inner joint section further includes a lateral wall extending, in the vehicle width direction, from the first sidewall to the second sidewall.

In the vehicle body structure according to the fourth aspect of the present disclosure, the inner joint section further includes the lateral wall spanning in the vehicle width direction between the first sidewall and the second sidewall, enabling the rigidity to be raised of the inner joint section as a whole.

A vehicle body structure according to a fifth aspect of the present disclosure is the vehicle body structure according to any one of the first to the fourth aspect, wherein the inner joint section is formed in an S-shape when viewed from a front side, in the vehicle front-rear direction, of the inner joint section.

In the vehicle body structure according to the fifth aspect of the present disclosure, the inner joint section is formed in an S-shape when viewed from the vehicle front-rear direction front side, enabling the number of joint locations joined to the outer joint section to be increased with a simple shape that considers mold opening when die-casting.

Note that the "S-shape" is not limited to a shape in which each of the walls is formed curved and all the walls are mutually connected together, but rather encompasses a shape in which each of the walls in the vehicle vertical direction, the vehicle width direction, etc. is formed in a straight line and all the walls are mutually connected together, i.e. what is referred to as a "substantially S-shape".

The first aspect of the present disclosure exhibits the effect of being able to suppress out-of-plane deformation of the rear floor side member rear in a rear-end collision of a vehicle at a joint section between a rear floor side member and the rear floor side member rear.

The second aspect of the present disclosure exhibits the effect of raising the rigidity of the rear floor side member rear so as to be able to suppress out-of-plane deformation of the rear floor side member rear in a rear-end collision of a vehicle.

The third aspect of the present disclosure exhibits the effect of raising joint rigidity of the joint section between the rear floor side member and the rear floor side member rear so as to enable steering stability to be raised.

The fourth aspect of the present disclosure exhibits the effect of raising the rigidity of the inner joint section as a whole so as to be able to further suppress out-of-plane deformation of the rear floor side member rear in a rear-end collision of a vehicle.

The fifth aspect of the present disclosure exhibits the effect of increasing the number of joint locations at the inner joint section joined to the outer joint section with a simple shape so as to be able to raise the joint rigidity between the inner joint section and the outer joint section.

BRIEF DESCRIPTION OF THE DRAWINGS

Exemplary embodiments of the present disclosure will be described in detail based on the following figures, wherein.

DETAILED DESCRIPTION

Explanation follows regarding a vehicle body (vehicle) applied with a vehicle body structure according to an exemplary embodiment of the present disclosure. Note that in the respective drawings, the arrow FR indicates a vehicle front-rear direction front side, and the arrow UP indicates a vehicle vertical direction upper side, as appropriate. The arrow OUT indicates a vehicle width direction outer side. Unless specifically stated otherwise, in the below explanation, simple reference to front and rear, left and right, and up and down directions refers to front and rear in the vehicle front-rear direction, left and right in the vehicle left-right direction (vehicle width direction), and up and down in the vehicle vertical direction.

Configuration of Vehicle Body Structure

First, explanation is given regarding configuration of the vehicle body structure according to the present exemplary embodiment.

Figure 1:
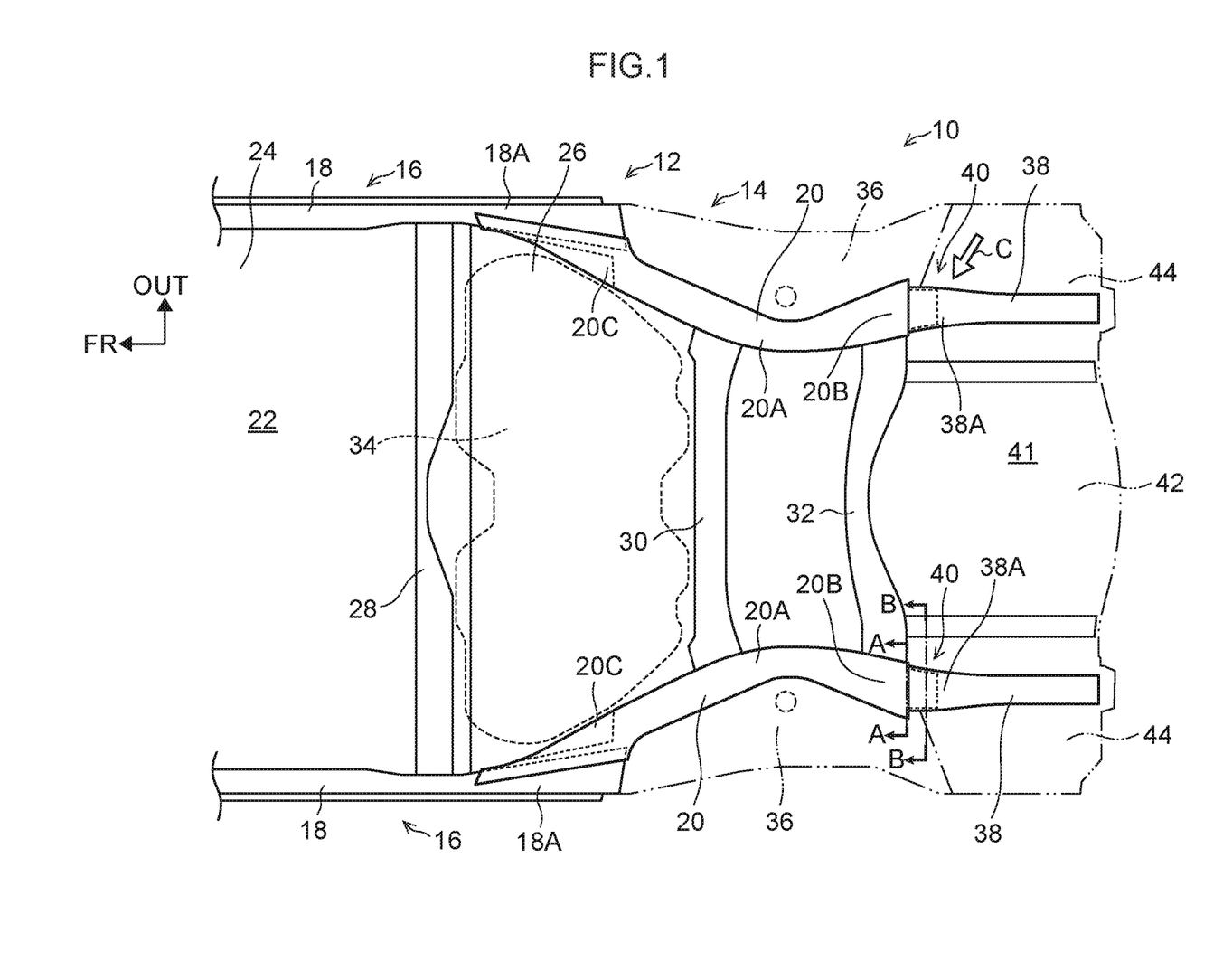
FIG. 1 is a plan view illustrating a rear side of a vehicle lower section applied with a vehicle body structure according to an exemplary embodiment of the present disclosure.

FIG. 1 is a plan view illustrating a rear section (hereafter referred to as "vehicle rear section") 14 side of a vehicle 10 applied with the vehicle body structure according to the present exemplary embodiment, illustrating a lower section (hereafter referred to as "vehicle lower section") 12 of the vehicle 10.

As illustrated in FIG. 1, left and right rockers 18 are provided extending along the vehicle front-rear direction at side sections (hereafter referred to as "vehicle side sections") 16 of the vehicle 10. A cross-section profile of each of the rockers 18 when sectioned along a direction orthogonal to the length direction of the rocker 18 (i.e. the vehicle vertical direction and the vehicle width direction) is a closed cross-section profile. The left and right rockers 18 configure parts of framework of the respective vehicle side sections 16.

A floor panel 24, configuring a floor surface of a vehicle cabin interior (cabin) 22, is provided extending along the vehicle front-rear direction and the vehicle width direction between the left and right rockers 18. The two vehicle width direction end portions of the floor panel 24 are respectively joined to the left and right rockers 18. A floor cross member 28 is installed extending along the vehicle width direction between the left and right rockers 18 at vehicle front-rear direction rear end portions 18A of the rockers 18. The floor cross member 28 is joined to the top of the floor panel 24.

Figure 2:
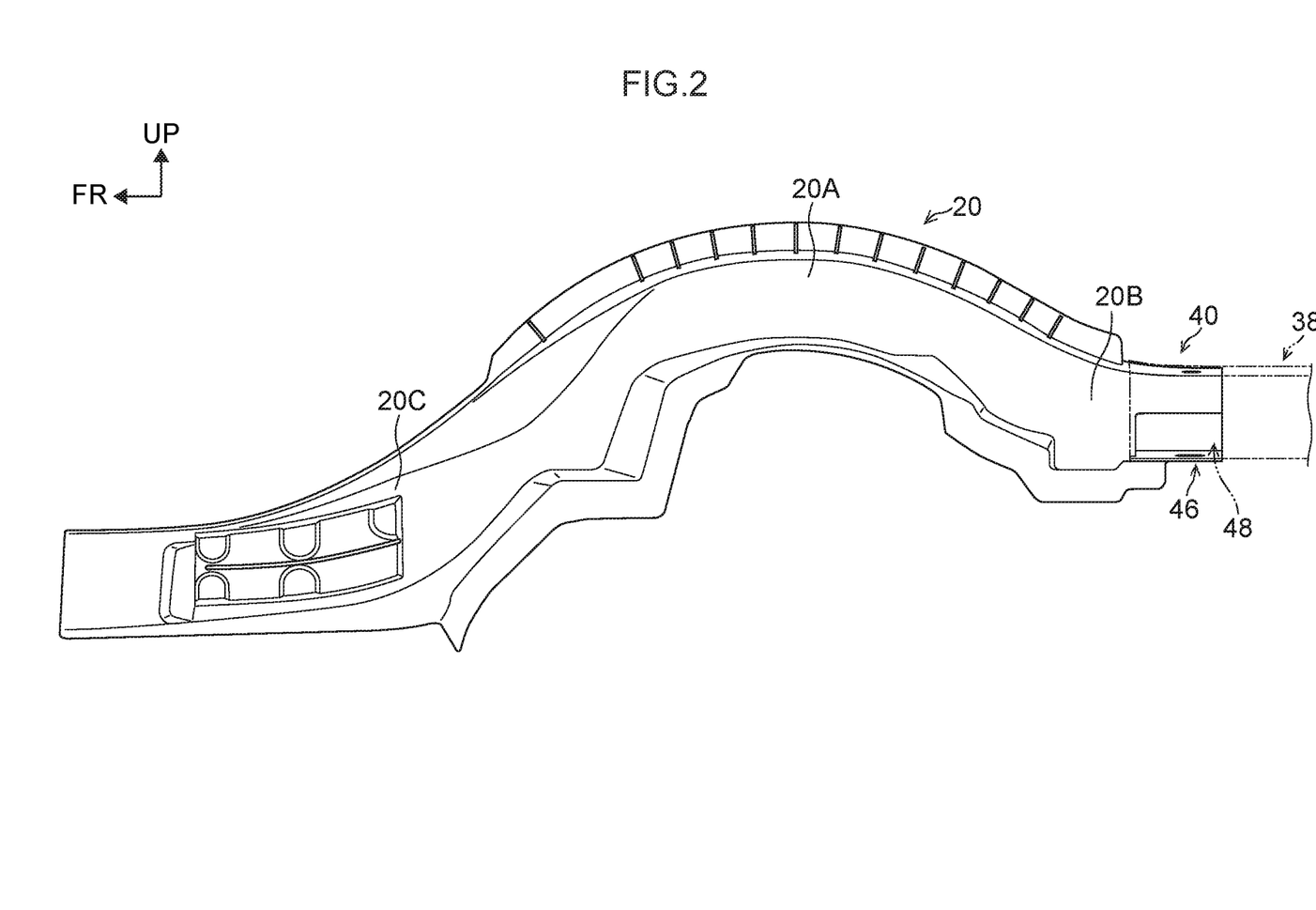
FIG. 2 is a side view illustrating a rear floor side member configuring part of a vehicle body structure according to an exemplary embodiment of the present disclosure.

Rear floor side members 20 each extend along the vehicle front-rear direction at the vehicle front-rear direction rear side of the respective left and right rockers 18. Each of the rear floor side members 20 is curved so as to project toward the vehicle width direction inner side in plan view, and curved so as to project toward the vehicle vertical direction upper side in vehicle side view, as illustrated in FIG. 2. Note that FIG. 2 illustrates one of the rear floor side members 20 in side view.

As illustrated in FIG. 1, a central floor panel 26, configuring the floor surface at a rear section side of the vehicle cabin interior 22, is provided between the left and right rear floor side members 20. The central floor panel 26 extends along the vehicle front-rear direction and the vehicle width direction, and is positioned at the vehicle front-rear direction rear side of the floor panel 24. The two vehicle width direction end portions of the central floor panel 26 are respectively joined to the left and right rear floor side members 20.

A floor cross member 30 is installed extending along the vehicle width direction between the left and right rear floor side members 20 at vehicle front-rear direction center portions 20A of the left and right rear floor side members 20. The floor cross member 30 is joined to the top of the central floor panel 26.

A floor cross member 32 is installed extending along the vehicle width direction between the left and right rear floor side members 20 at vehicle front-rear direction rear end portions 20B of the rear floor side members 20. Similarly to the floor cross member 30 described above, the floor cross member 32 is also joined to the top of the central floor panel 26.

Note that a fuel tank 34 is installed at the lower side of the central floor panel 26 between vehicle front-rear direction front portion 20C sides of the left and right rear floor side members 20, namely, between the floor cross member 28 and the floor cross member 30. Moreover, although not illustrated in the drawings, suspension towers 36 etc. with attached shock absorbers are respectively provided at the vehicle width direction outer sides of the left and right rear floor side members 20.

Rear floor side member rears 38 respectively extend along the vehicle front-rear direction at the vehicle front-rear direction rear side of the left and right rear floor side members 20. A cross-section profile of each of the right rear floor side member rears 38 when sectioned along the vehicle vertical direction and the vehicle width direction is an open cross-section profile, open toward the vehicle vertical direction lower side. Vehicle front-rear direction front end portions 38A of the left and right rear floor side member rears 38 are respectively joined to the vehicle front-rear direction rear end portions 20B of the corresponding left and right rear floor side members 20 so as to cover the outside of the rear floor side members 20 (at joint sections 40).

A rear floor panel 42, configuring a floor surface of a luggage compartment interior 41, is provided extending along the vehicle front-rear direction and the vehicle width direction at the vehicle front-rear direction rear side of the central floor panel 26. Rear floor side panels 44 are respectively provided extending along the vehicle front-rear direction and the vehicle width direction at the two vehicle width direction outer sides of the rear floor panel 42. The left and right rear floor side member rears 38 are respectively joined to the rear floor side panels 44.

Explanation follows regarding the joint sections 40 between the vehicle front-rear direction rear end portions 20B of the respective rear floor side members 20 and the vehicle front-rear direction front end portions 38A of the respective rear floor side member rears 38.

Figure 3:
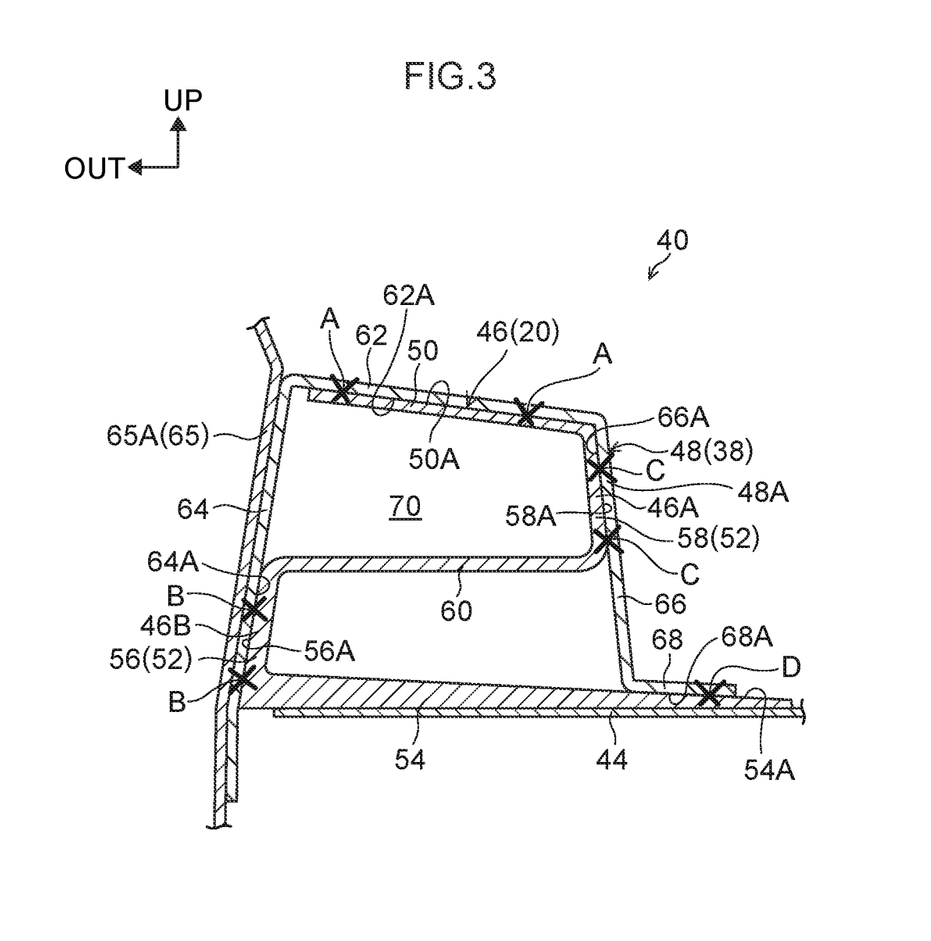
FIG. 3 is a cross-section illustrating a joint section between a rear floor side member and a rear floor side member rear at a cross-section position when sectioned along line A-A in FIG. 1.
Figure 4:
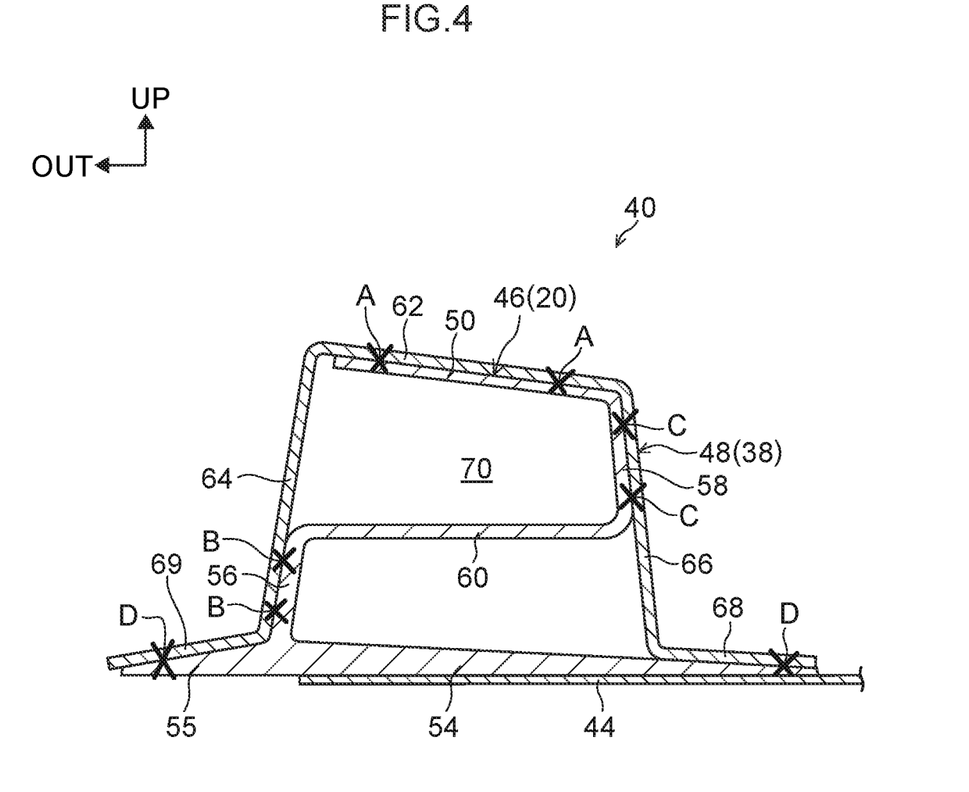
FIG. 4 is a cross-section illustrating a joint section between a rear floor side member and a rear floor side member rear at a cross-section position when sectioned along line B-B in FIG. 1.
Figure 5:
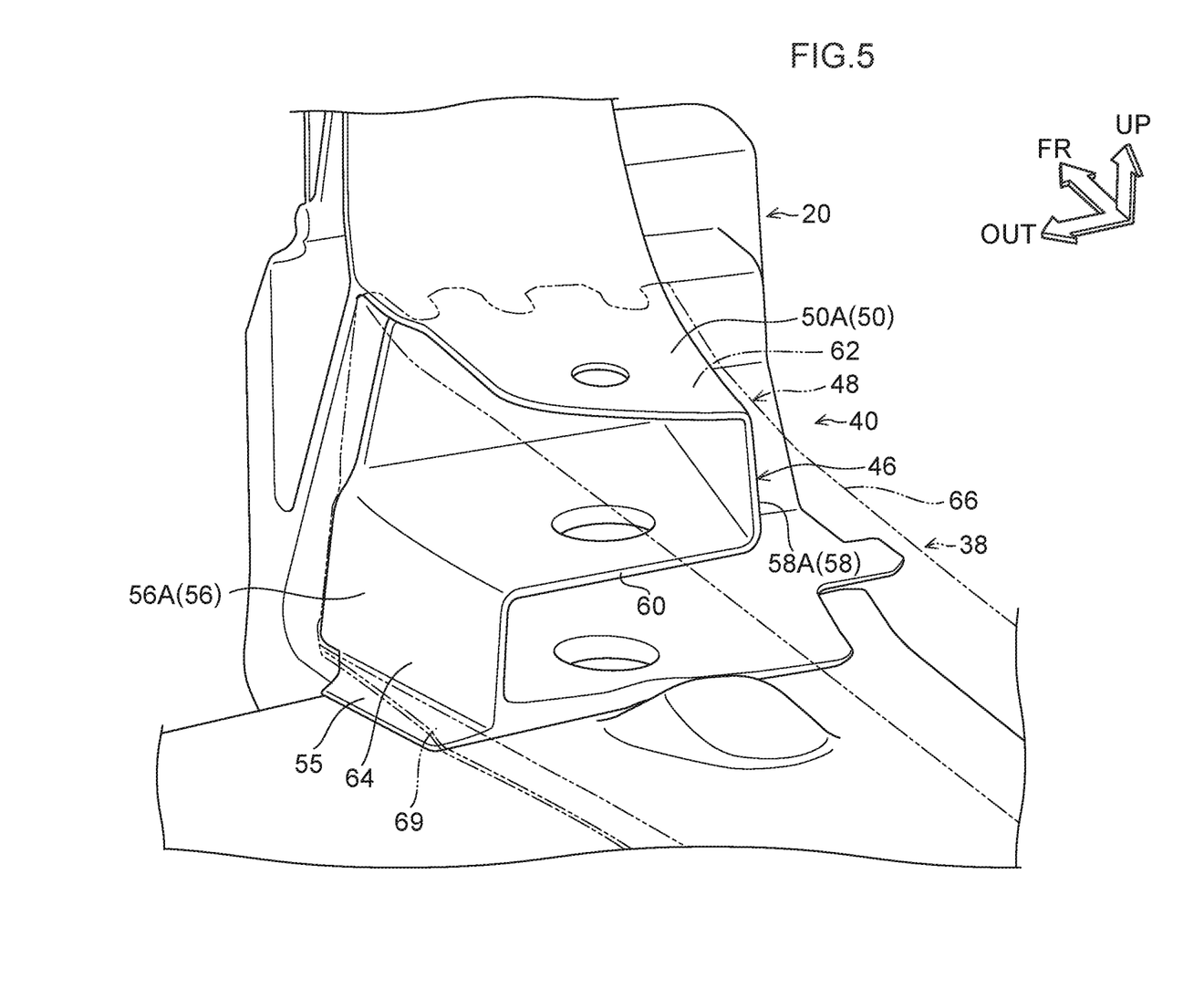
FIG. 5 is a drawing illustrating a joint section between a rear floor side member and a rear floor side member rear as viewed along the direction of arrow C in FIG. 1.

FIG. 3 illustrates the cross-section profile of the joint section 40 between the rear floor side member 20 and the rear floor side member rear 38 at a cross-section position when sectioned along line A-A in FIG. 1. FIG. 4 illustrates a cross-section profile of the joint section 40 at a cross-section position when sectioned along line B-B in FIG. 1. In FIG. 5, the joint section 40 is viewed along the direction of arrow C in FIG. 1.

As illustrated in FIG. 3 and FIG. 5, in the present exemplary embodiment, at the joint section 40 between the rear floor side member 20 and the rear floor side member rear 38, a front end portion (hereafter referred to as the "outer joint section") 48 of the rear floor side member rear 38 is joined to a rear end portion (hereafter referred to as the "inner joint section") 46 of the rear floor side member 20 so as to cover the inner joint section 46 from the outside thereof. Namely, in the joint section 40, an inner side of the joint section 40 is configured by the inner joint section 46, and an outer side of the joint section 40 is configured by the outer joint section 48.

In the present exemplary embodiment, the rear floor side member 20 is, for example, formed of die-cast aluminum using a mold having mold opening in a direction running along the vehicle width direction of the rear floor side member 20. Note that the rear floor side member 20 is not limited to being formed of aluminum, and may be a die-cast article formed of an alloy of zinc, magnesium, copper, or the like, or may be a casting formed using a sand mold. The rear floor side member rear 38 is, for example, formed from a steel sheet serving as a sheet member formed with a substantially uniform thickness. Note that there is no limitation to a steel sheet, and the rear floor side member rear 38 may obviously be formed using a sheet member using another metal such as an aluminum alloy.

First, explanation of the joint section 40 is given regarding the inner joint section 46 of the rear floor side member 20.

As illustrated in FIG. 5, in the present exemplary embodiment, the inner joint section 46 provided on the rear floor side member 20 side has a substantially inverted S-shape when the joint section 40 between the rear floor side member 20 and the rear floor side member rear 38 is viewed from the vehicle rear side. Although not illustrated in the drawings, the inner joint section 46 has a substantially S-shape when the joint section 40 is viewed from the vehicle front side.

As illustrated in FIG. 3 and FIG. 5, an upper wall 50 is provided to the inner joint section 46. The upper wall 50 is formed running along the vehicle front-rear direction and the vehicle width direction at an upper portion 46A of the inner joint section 46. An upper face 50A of the upper wall 50 configures a joining face joined to the outer joint section 48, described later. Joining walls 52 and a lower wall 54 are also formed to the inner joint section 46. The joining walls 52 are formed with two joining faces 56A, 58A positioned with orientations intersecting the upper face 50A of the upper wall 50. The lower wall 54 is provided to a lower portion 46B of the inner joint section 46. The thickness of the lower wall 54 is formed so as to be thicker than the thickness of the upper wall 50.

The joining walls 52 are configured including an outer wall (first sidewall) 56 and an inner wall (second sidewall) 58. The outer wall 56 is formed running along the vehicle vertical direction and the vehicle front-rear direction and is disposed on the vehicle width direction outer side of the inner joint section 46. The inner wall 58 is formed running along the vehicle vertical direction and the vehicle front-rear direction and is disposed on the vehicle width direction inner side of the inner joint section 46. The joining face 56A is formed to the outer wall 56 on an outer face side of the inner joint section 46, and the joining face 58A is formed to the inner wall 58 on an outer face side of the inner joint section 46.

The inner wall 58 is provided on the upper portion 46A side of the inner joint section 46, and the outer wall 56 is provided on the lower portion 46B side of the inner joint section 46. Namely, the joining face 58A of the inner wall 58 is formed in a state contiguous to the upper face 50A of the upper wall 50, and the joining face 56A of the outer wall 56 is formed in a state non-contiguous to the upper face 50A of the upper wall 50. Moreover, a lateral wall 60 formed along the vehicle front-rear direction and the vehicle width direction spans between a lower end of the inner wall 58 and an upper end of the outer wall 56.

Explanation of the joint section 40 is now given regarding the outer joint section 48 of the rear floor side member rear 38.

As described above, the cross-section profile of the rear floor side member rear 38 illustrated in FIG. 3 when sectioned along the vehicle vertical direction and the vehicle width direction is an open cross-section profile, open toward the vehicle vertical direction lower side. An upper wall 62 is provided to the outer joint section 48 of the rear floor side member rear 38. The upper wall 62 is provided to an upper portion 48A of the outer joint section 48 so as to be capable of abutting the upper wall 50 of the inner joint section 46 of the rear floor side member 20. The upper wall 62 is formed running along the vehicle front-rear direction and the vehicle width direction. The upper wall 62 is formed with an abutting face 62A capable of abutting the upper face 50A formed to the upper wall 50 of the inner joint section 46.

An outer wall 64 is also provided to the outer joint section 48. The outer wall 64 is linked to the upper wall 62, and is disposed on the vehicle width direction outer side so as to be capable of abutting the outer wall 56 of the inner joint section 46. The outer wall 64 is formed running along the vehicle vertical direction and the vehicle front-rear direction. The outer wall 64 is formed with an abutting face 64A capable of abutting the joining face 56A formed to the outer wall 56 of the inner joint section 46.

An inner wall 66 is also provided to the outer joint section 48. The inner wall 66 is linked to the upper wall 62, and is disposed at the vehicle width direction inner side so as to be capable of abutting the inner wall 58 of the inner joint section 46. The inner wall 66 is formed running along the vehicle vertical direction and the vehicle front-rear direction. The inner wall 66 is formed with an abutting face 66A that is capable of abutting the joining face 58A formed to the inner wall 58 of the inner joint section 46.

Note that a wheelhouse inner rear 65A configuring part of a wheelhouse 65 is joined to the outer wall 64 of the outer joint section 48. A flange 68 extends from a lower end of the inner wall 66 of the outer joint section 48 outwards from the outer joint section 48 (toward the vehicle width direction inner side).

As described above, FIG. 3 illustrates the cross-section profile of the joint section 40 between the rear floor side member 20 and the rear floor side member rear 38 at a cross-section position when sectioned along line A-A in FIG. 1. The outer wall 64 of the outer joint section 48 extends toward the vehicle vertical direction lower side, without provision of a flange on the outer wall 64 extending outwards from the outer joint section 48 (toward the vehicle width direction outer side).

FIG. 4 illustrates the cross-section profile of the joint section 40 at a cross-section position when sectioned along line B-B in FIG. 1. Note that the flange 68 is formed on the inner wall 66 side of the outer joint section 48. Similarly to on the inner wall 66, a flange 69 is also formed on the outer wall 64 side of the outer joint section 48. The flange 69 extends outwards from the outer joint section 48 (the vehicle width direction outer side). A flange 55 to which the flange 69 of the outer wall 64 is joined extends from the lower wall 54 on the inner joint section 46 side.

Due to the flanges 68, 69 being formed to the inner wall 66 and the outer wall 64 of the outer joint section 48 so as to extend outwards from the outer joint section 48 as described above, the cross-section profile of the outer joint section 48 is what is referred to as a hat-shaped cross-section profile. Namely, in the present exemplary embodiment, in the joint section 40 between the rear floor side member 20 and the rear floor side member rear 38, the profiles of the outer joint section 48 and the inner joint section 46 differ slightly depending on the position in the vehicle front-rear direction of the cross-section.

Due to being configured as described above, in the present exemplary embodiment, the joint section 40 between the rear floor side member 20 and the rear floor side member rear 38 is set such that the outer joint section 48 of the rear floor side member rear 38 covers the inner joint section 46 of the rear floor side member 20 from the outside of the inner joint section 46.

Accordingly, as illustrated in FIG. 3, the upper wall 62 of the outer joint section 48 is joined to the upper wall 50 of the inner joint section 46 (at joint locations A) in a state in which the abutting face 62A of the upper wall 62 of the outer joint section 48 of the rear floor side member rear 38 abuts the upper face 50A of the upper wall 50 of the inner joint section 46 of the rear floor side member 20. Moreover, the outer wall 64 of the outer joint section 48 is joined to the outer wall 56 of the inner joint section 46 (at joint locations B) in a state in which the abutting face 64A of the outer wall 64 of the outer joint section 48 abuts the joining face 56A of the outer wall 56 of the inner joint section 46. Moreover, the inner wall 66 of the outer joint section 48 is joined to the inner wall 58 of the inner joint section 46 (at joint locations C) in a state in which the abutting face 66A of the inner wall 66 of the outer joint section 48 abuts the joining face 58A of the inner wall 58 of the inner joint section 46. Moreover, the flange 68 of the outer joint section 48 is joined to the lower wall 54 of the inner joint section 46 (at joint locations D) in a state in which the lower face 68A of the flange 68 of the outer joint section 48 abuts an upper face 54A of the lower wall 54 of the inner joint section 46.

In the joint section 40, the outer joint section 48 of the rear floor side member rear 38 is joined to the outer side of the inner joint section 46 of the rear floor side member 20 by one-sided joining using flow drill screws (FDS) or the like, or by double-sided joining using self-piercing rivets (SPR) or the like. For example, in the present exemplary embodiment, one-sided joining is employed at the joint locations A, the joint locations B, and the joint locations C, and double-sided joining is employed at the joint locations D.

Although not illustrated in the drawings, the outer joint section 48 is joined to the rear floor side panel 44 at locations other than the joint section 40, such that in a cross-section profile when sectioned along the vehicle vertical direction and the vehicle width direction, the outer joint section 48 forms a closed cross-section area 70 against the rear floor side panel 44.

Operation and Effects of Vehicle Body Structure

Explanation follows regarding operation and effects of the vehicle body structure according to the present exemplary embodiment.

In the present exemplary embodiment, the rear floor side members 20 that extend along the vehicle front-rear direction at the vehicle width direction end portions of the vehicle rear section 14 illustrated in FIG. 1 are formed from die-cast aluminum. The rear floor side member rear 38 joined to the vehicle front-rear direction rear end portion 20B of each of the rear floor side members 20 is formed from a steel sheet.

Generally there is a high degree of freedom for design with die-cast members formed by die-casting, and a high rigidity may be obtained when forming by increasing the thickness according to location or by providing reinforcing ribs. By contrast, since sheet members made from metal have a substantially uniform thickness, the rigidity of the sheet member is largely determined by the thickness. Although the thickness of sheet members can be increased in order to set a higher rigidity, so doing would increase the weight of the vehicle.

Against this backdrop, there is a tendency when die-cast members and sheet members are used for automotive members for the sheet members to have a lower rigidity. This gives rise to the possibility of out-of-plane deformation of a sheet member at a joint section joining a die-cast member and a sheet member together when collision load is transmitted from the sheet member to the die-cast member side in a vehicle collision.

Figure 9:
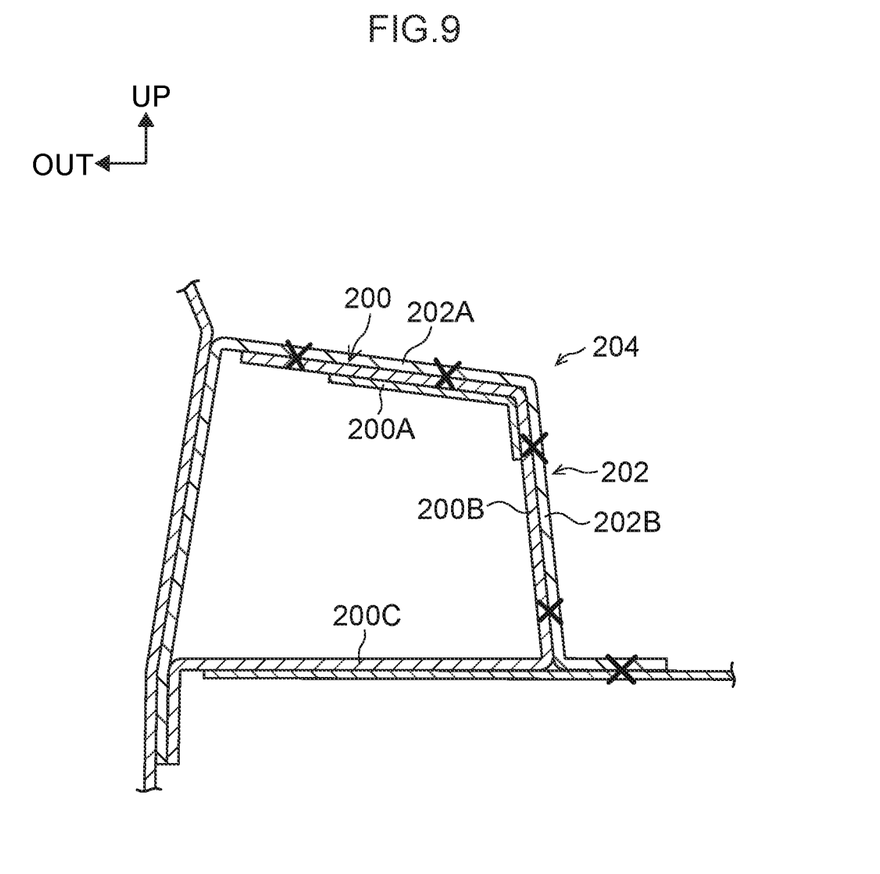
FIG. 9 is a cross-section corresponding to FIG. 3 for a comparative example.

In a comparative example, as illustrated in FIG. 9 for example, the cross-section profile of a rear floor side member 200 configured by a die-cast member when sectioned along the vehicle vertical direction and the vehicle width direction is an open cross-section profile, open toward the vehicle width direction outer side. The rear floor side member 200 is thus configured by an upper wall 200A, an inner wall 200B, and a lower wall 200C.

Accordingly, at a joint section 204 of a rear floor side member rear 202 configured by a sheet member with the rear floor side member 200, the two joining faces at an upper wall 202A and an inner wall 202B are respectively joined to the upper wall 200A and the inner wall 200B of the rear floor side member 200. Namely, in the comparative example, there are only two joining faces provided to the rear floor side member rear 202 for joining to the rear floor side member 200.

Figure 10:
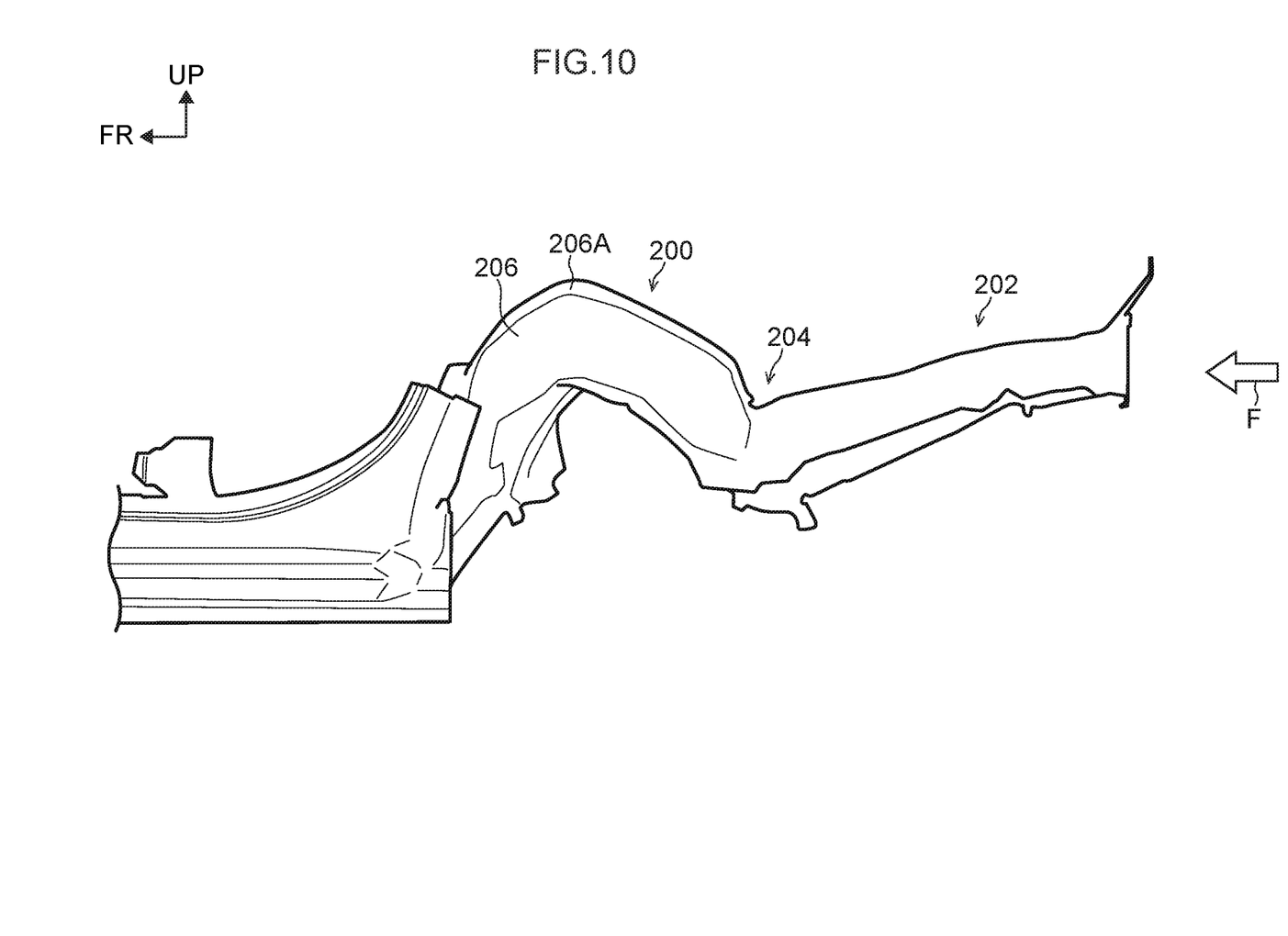
FIG. 10 is a vehicle side view corresponding to FIG. 6 for a comparative example.

Accordingly, as illustrated in FIG. 10, in the comparative example, when a collision load F is input to the rear floor side member rear 202 configured by a sheet member, the rear floor side member rear 202 deforms out-of-plane and buckles at the joint section 204 joined to the rear floor side member rear 202.

Energy absorption efficiency is thus poor due to the plastic deformation of the rear floor side member rear 202, such that the collision load F is transmitted to the rear floor side member 200 without being sufficiently attenuated. Folding at an apex 206A side of a curving portion 206 may accordingly occur in the rear floor side member 200.

By contrast, in the present exemplary embodiment, as illustrated in FIG. 3 and FIG. 5, at the joint section 40 between the rear floor side member 20 that is formed from die-cast aluminum and the rear floor side member rear 38 that is formed from a steel sheet, the outer joint section 48 provided on the rear floor side member rear 38 side is joined from the outside of the inner joint section 46 provided on the rear floor side member 20 side.

In the joint section 40, the outer joint section 48 is abutted against and joined from the outside of the inner joint section 46 at least at the upper wall 50 of the inner joint section 46 and the joining walls 52 that are formed with two faces positioned with orientations intersecting the upper wall 50. Accordingly, in the present exemplary embodiment, the joint section 40 is capable of increasing joint rigidity and joint strength in comparison to cases in which only two joining faces are provided, such as in the comparative example, by an amount commensurate with the increase in the number of joining faces.

Figure 6:
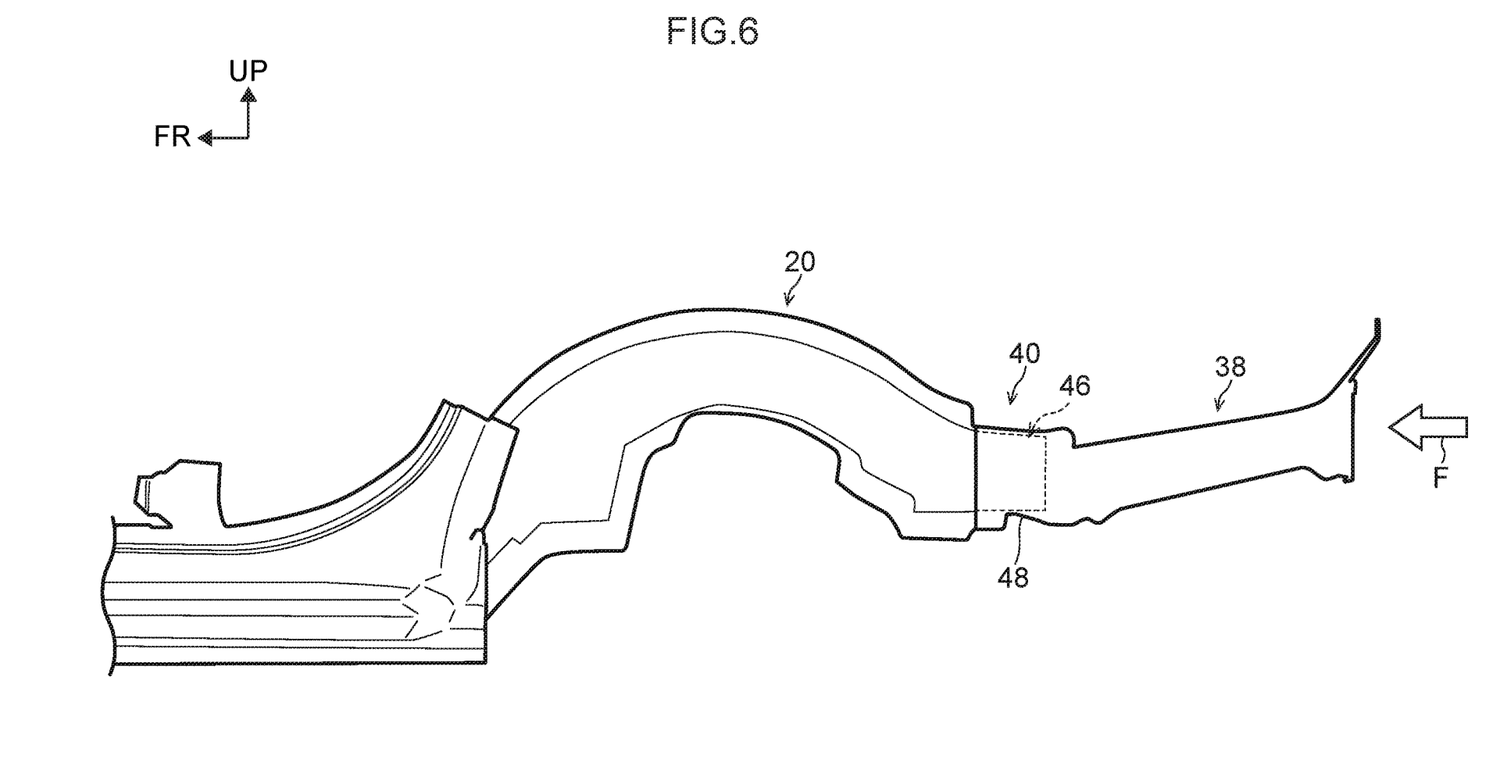
FIG. 6 is a vehicle side view to explain operation of a joint section between a rear floor side member and a rear floor side member rear as applied to a vehicle body structure according to an exemplary embodiment of the present disclosure.

By increasing joint rigidity at the joint section 40 between the rear floor side members 20 and the rear floor side member rear 38 in this manner, deformation of the rear floor side member rear 38 is restrained by the joint locations A, the joint locations B, and the joint locations C joining to the rear floor side members 20. Accordingly, in the joint section 40 out-of-plane, deformation of the rear floor side member rear 38 is suppressed in a rear-end collision of the vehicle 10 (see FIG. 1). Thus, as illustrated in FIG. 6, buckling due to out-of-plane deformation of the rear floor side member rear 38 is accordingly suppressed.

Moreover, a load transmission path can be secured by increasing the joint strength of the joint section 40 illustrated in FIG. 3 and FIG. 5, thereby enabling load transmission efficiency to be raised. This enables the energy absorption efficiency of the rear floor side member rear 38 to be increased. Namely, suppressing out-of-plane deformation of the rear floor side member rear 38 and increasing the load transmission efficiency in the joint section 40, as described above, enables the rear floor side member rear 38 to be caused to undergo sufficient axial compression.

This improves energy absorption efficiency of the rear floor side member rear 38. As a result, the collision load F transmitted from the rear floor side member rear 38 to the rear floor side member 20 can be reduced, enabling folding of the rear floor side members 20 to be suppressed and enabling occupants, a battery (not illustrated in the drawings), and the fuel tank 34 (see FIG. 1) to be protected.

As illustrated in FIG. 1 to FIG. 3, in the present exemplary embodiment each of the rear floor side panels 44 extends along the vehicle front-rear direction and the vehicle width direction at vehicle width direction end portions of the vehicle rear section 14. At the joint section 40 between the rear floor side member 20 and the rear floor side member rear 38, the cross-section profile of the outer joint section 48 provided to the rear floor side member rear 38 when sectioned along the vehicle vertical direction and the vehicle width direction is an open cross-section profile, open toward the vehicle vertical direction lower side. Moreover, the outer joint section 48 forms the closed cross-section area 70 against the rear floor side panel 44. This enables the rigidity of the rear floor side member rear 38 to be increased at the joint section 40.

In the present exemplary embodiment, at the joint section 40 between the rear floor side member 20 and the rear floor side member rear 38, the two joining faces 56A, 58A, which are positioned with orientations intersecting the upper face 50A provided to the upper portion 46A of the inner joint section 46 of the rear floor side member 20, are respectively formed to the outer wall 56 and the inner wall 58 provided on the two vehicle width direction sides of the inner joint section 46.

Namely, the outer joint section 48 of the rear floor side member rear 38 is abutted against and joined from the outside of the inner joint section 46 at least at the upper wall 50 formed with the upper face 50A, the outer wall 56, and the inner wall 58 of the inner joint section 46 of the rear floor side member 20. This enables the joint rigidity to be raised for the joint section 40 between the rear floor side member 20 and the rear floor side member rear 38, enabling steering stability to be increased.

Moreover, in the present exemplary embodiment, the inner joint section 46 further includes the lateral wall 60 that spans along the vehicle width direction between the outer wall 56 and the inner wall 58, thereby increasing the rigidity of the inner joint section 46 itself. This enables out-of-plane deformation of the rear floor side member rear 38 to be further suppressed in a rear-end collision of the vehicle 10 (see FIG. 1).

In the present exemplary embodiment, the rear floor side member 20 is, for example, formed by die-casting using a mold having mold opening in a direction running along the vehicle width direction of the rear floor side member 20. Accordingly, as illustrated in FIG. 5, when viewing the joint section 40 from the vehicle rear side, the inner joint section 46 of the rear floor side member 20 forms a substantially inverted S-shape. The inner joint section 46 is thus formed in a state in which the upper wall 50, the inner wall 58, the lateral wall 60, the outer wall 56, and the lower wall 54 are contiguous to one another.

Accordingly, as illustrated in FIG. 3, in the present exemplary embodiment, the outer joint section 48 of the rear floor side member rear 38 can be abutted against and joined from the outside to the inner joint section 46 at the upper wall 50, the inner wall 58, and the outer wall 56 of the inner joint section 46. Namely, the present exemplary embodiment enables an increase in the number of joint locations at the inner joint section 46 to the joint locations A, B, C joined to the outer joint section 48 using a simple shape that considers mold opening when die-casting aluminum. By increasing the number of joint locations between the inner joint section 46 and the outer joint section 48 to the joint locations A, B, C in this manner, the joint rigidity of the joint section 40 between the rear floor side member 20 and the rear floor side member rear 38 can also be increased.

Modified Examples of the Present Exemplary Embodiment

As illustrated in FIG. 3, in the present exemplary embodiment the rear floor side member rear 38 is formed from a single member. However, there is no limitation thereto.

Figure 7:
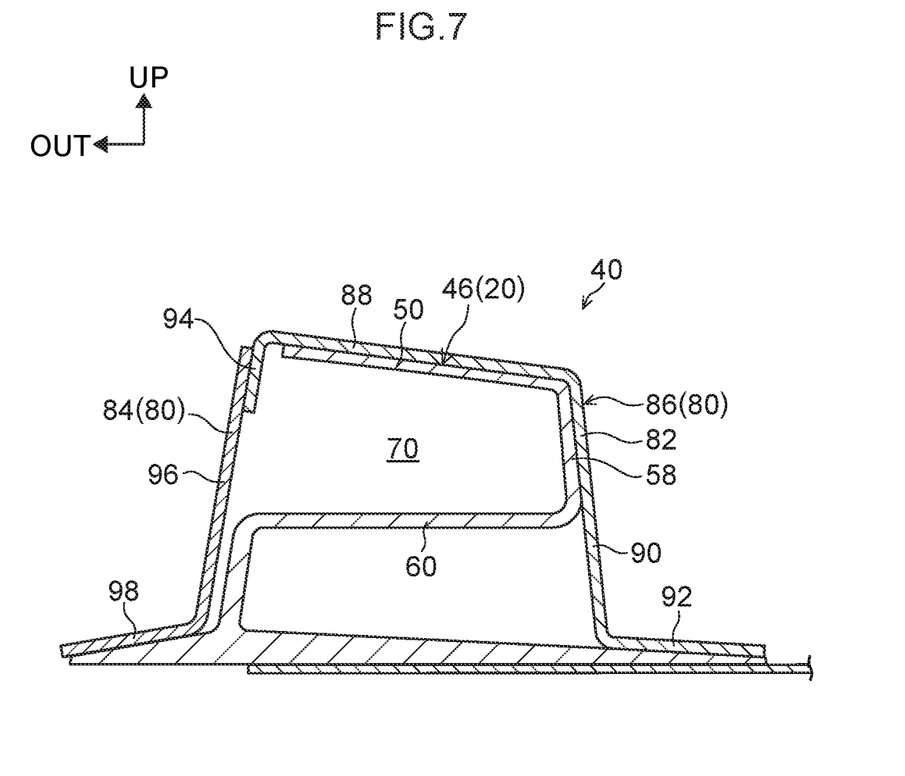
FIG. 7 is a cross-section corresponding to FIG. 3, illustrating a first modified example of a joint section between a rear floor side member and a rear floor side member rear as applied to a vehicle body structure according to an exemplary embodiment of the present disclosure.

For example, in a first modified example, as illustrated in FIG. 7, a rear floor side member rear 80 may be configured including an inner rear floor side member rear 82 at a vehicle width direction inner side thereof, and an outer rear floor side member rear 84 at a vehicle width direction outer side thereof.

In this example, the inner rear floor side member rear 82 is formed with a substantially crank shape. More specifically, the inner rear floor side member rear 82 is configured including an upper wall 88 configuring an upper portion of an outer joint section 86 of the rear floor side member rear 80, an inner wall 90 configuring a vehicle width direction inner side of the outer joint section 86, and a flange 92 extending substantially along a horizontal direction from a vehicle width direction inner end of the inner wall 90. A joining wall 94 projects downward from a vehicle width direction outer end of the upper wall 88.

The outer rear floor side member rear 84 is configured including an outer wall 96 configuring a vehicle width direction outer side of the outer joint section 86, and a flange 98 extending substantially along the horizontal direction from a vehicle width direction outer end of the outer wall 96. The outer wall 96 of the outer rear floor side member rear 84 may be joined to the joining wall 94 of the inner rear floor side member rear 82 by spot welding or the like, so as to integrate the outer rear floor side member rear 84 and the inner rear floor side member rear 82 together into a single unit.

In the present exemplary embodiment, as illustrated in FIG. 3, a cross-section profile of the rear floor side member rear 38 when sectioned along the vehicle vertical direction and the vehicle width direction is an open cross-section profile, open toward the vehicle vertical direction lower side. However, the profile of the rear floor side member rear 38 is not limited thereto.

Figure 8:
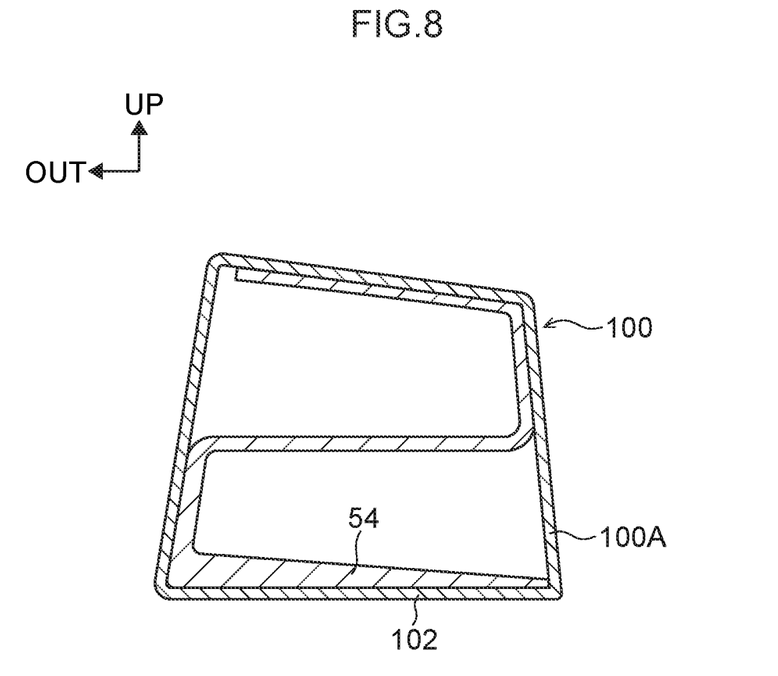
FIG. 8 is a cross-section corresponding to FIG. 3, illustrating a second modified example of a joint section between a rear floor side member and a rear floor side member rear as applied to a vehicle body structure according to an exemplary embodiment of the present disclosure.

For example, in a second modified example, as illustrated in FIG. 8, the cross-section profile of a rear floor side member rear 100 when sectioned along the vehicle vertical direction and the vehicle width direction may be a closed cross-section profile configuring a tube shaped member formed in a rectangular shape. Note that in such cases, the rear floor side member rear 100 is formed by extrusion or drawing instead of plastically molding a sheet member such as a panel. In such cases, the lower wall 54 of the rear floor side member 20 is joined to a lower wall 102 provided to a lower portion 100A of the rear floor side member rear 100.

Supplementary Matter Regarding the Present Exemplary Embodiment

In the exemplary embodiment described above, the upper wall 50, the inner wall 58, and the outer wall 56 are provided as joining faces to the inner joint section 46 illustrated in FIG. 3. However, there is no limitation thereto as long as there are three joining faces, including two faces positioned with orientations intersecting the upper face 50A.

For example, although not illustrated in the drawings, joining faces may be provided to the lateral wall 60, the inner wall 58, and the outer wall 56. Alternatively, joining faces may be provided to the upper wall 50, the lateral wall 60, and either the inner wall 58 or the outer wall 56. Moreover, the cross-section profile of the inner joint section 46 is not limited to being a substantially S-shape, and may be a substantially Z-shape. The cross-section profile is moreover not limited to shapes resembling letters of the alphabet or the like, and any shape may be adopted in which the upper wall 50, the lateral wall 60, and either the inner wall 58 or the outer wall 56 are simply linked together.

In the present exemplary embodiment, the rear floor side member 20 is formed from die-cast aluminum using a mold having mold opening along the vehicle width direction. However, the direction of mold opening is not limited thereto. For example, although not illustrated in the drawings, a rear floor side member may be formed from die-cast aluminum with mold opening along the vehicle vertical direction. The cross-section profile of such a rear floor side member may be changed as appropriate according to the mold opening direction. For example, the cross-section profile may be formed in a substantially N-shape or a substantially H-shape.

Although explanation has been given regarding an example of an exemplary embodiment of the present disclosure, exemplary embodiments of the present disclosure are not limited to the above, and obviously the exemplary embodiments and various modified examples may be employed in appropriate combinations, or various embodiments may be implemented within a range not departing from the spirit of the present disclosure.

What is claimed is:

1. A vehicle body structure, comprising:
   a die-cast rear floor side member that extends along a vehicle front-rear direction at an end portion, in a vehicle width direction, of a vehicle rear section; and
   a metal rear floor side member rear that extends along the vehicle front-rear direction at a rear side, in the vehicle front-rear direction, of the rear floor side member, and that is formed from a sheet member or a tube-shaped member having a uniform thickness,
   a joint section, at which a rear end portion, in the vehicle front-rear direction, of the rear floor side member and a front end portion, in the vehicle front-rear direction, of the rear floor side member rear are joined together, the joint section including:
      an inner joint section provided at a side of the rear floor side member so as to configure an inner side of the joint section, the inner joint section including at least three joining faces including an upper face provided at an upper portion, in a vehicle vertical direction, of the inner joint section and two faces positioned with orientations intersecting the upper face in a cross-section profile of the inner joint section sectioned along the vehicle vertical direction and the vehicle width direction, the inner joint section formed in an S-shape when viewed from a front side, in the vehicle front-rear direction, of the inner joint section, and
      an outer joint section provided at the side of the rear floor side member rear so as to configure an outer side of the joint section, the outer joint section abutted against and joined to the three joining faces of the inner joint section from an outer side of the inner joint section, the outer joint section including an outer joint section flange extending outwardly from a lower end of the outer joint section, the inner joint section including an inner joint section flange extending outwardly from a lower end of the inner joint section and joined to the outer joint section flange.

2. The vehicle body structure of claim 1, further comprising:
   a rear floor side panel that extends along the vehicle front-rear direction and the vehicle width direction at a vehicle width direction end portion of the vehicle rear section,
   wherein the outer joint section has a cross-section profile, when sectioned along the vehicle vertical direction and the vehicle width direction, that is an open cross-section profile that is open toward a lower side in the vehicle vertical direction, and the outer joint section forms a closed cross-section area against the rear floor side panel.

3. The vehicle body structure of claim 1, wherein the two joining faces positioned with orientations intersecting the upper face are formed at a first sidewall and a second sidewall respectively provided at either side, in the vehicle width direction, of the inner joint section.

4. The vehicle body structure of claim 3, wherein the inner joint section further includes a lateral wall extending, in the vehicle width direction, from the first sidewall to the second sidewall.

5. The vehicle body structure of claim 1, wherein the rear floor side member rear includes an inner rear floor side member rear configuring an inner side, in the vehicle width direction, of the rear floor side member rear, and an outer rear floor side member rear configuring an outer side, in the vehicle width direction, of the rear floor side member rear.

6. The vehicle body structure of claim 1, wherein the rear floor side member rear has a cross-section profile sectioned along the vehicle vertical direction and the vehicle width direction that is a closed cross-section profile of a tube-shaped member formed in a rectangular shape.

\* \* \* \* \*